(12) United States Patent
Bobier

(10) Patent No.: US 8,275,065 B2
(45) Date of Patent: Sep. 25, 2012

(54) SYSTEM AND METHOD FOR POWER SAVING CODING IN INTEGER CYCLE OR IMPULSE TYPE MODULATION TRANSMISSIONS

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 494 days.

(21) Appl. No.: 12/460,485

(22) Filed: Jul. 20, 2009

(65) Prior Publication Data

US 2010/0027714 A1 Feb. 4, 2010

Related U.S. Application Data

(60) Provisional application No. 61/137,737, filed on Aug. 1, 2008.

(51) Int. Cl.
*H04L 27/00* (2006.01)

(52) U.S. Cl. ............... 375/295; 375/298; 375/308

(58) Field of Classification Search ............... 375/220, 375/295–352
See application file for complete search history.

(56) References Cited

U.S. PATENT DOCUMENTS

| | | | |
|---|---|---|---|
| 4,360,840 A | | 11/1982 | Wolfrum et al. |
| 2003/0157950 A1* | | 8/2003 | Sugaya .................. 455/507 |
| 2003/0235235 A1* | | 12/2003 | Santhoff .................. 375/130 |
| 2005/0007447 A1 | | 1/2005 | Bobier et al. |
| 2007/0230610 A1 | | 10/2007 | Poberezhskiy |
| 2008/0028281 A1* | | 1/2008 | Miyazaki et al. .......... 714/776 |

* cited by examiner

*Primary Examiner* — Sam K Ahn
*Assistant Examiner* — Janice Tieu
(74) *Attorney, Agent, or Firm* — Dennis L. Cook, Esq.

(57) ABSTRACT

A system and method for substantially reducing average transmit power by omitting the transmission of a majority of pulses by using a modified run length coding to reduce signal power. By lowering the average power, an opportunity is presented to either decrease the total power drawn by the transmitter (battery life) or raise the peak power of all symbols (Eb/No), thereby increasing range of a RF transmission system.

4 Claims, 2 Drawing Sheets

Depiction of transmit pulse train with relation to binary values and 3db boosted symbols.

The coding constellation

Figure 3

| Special coding | +1 0 | -1 180 | +.5 90 | -.5 270 | Amplitude increase |
|---|---|---|---|---|---|
| Non-repeating 0 | | X | | | 0db |
| Non-repeating 1 | X | | | | 0db |
| Start of repeating 1's | | | X | | 3db |
| End of repeating 1's | | | | X | 3db |
| Start of repeating 0's | | | | X | 3db |
| End of repeating 0's | | | X | | 3db |
| Start alternating 1's – 0's | | X | | | 3db |
| End of alternating 1's – 0's | X | | | | 3db |
| Start alternating 0's – 1's | X | | | | 3db |
| End alternating 0's – 1's | | X | | | 3db |

SYSTEM AND METHOD FOR POWER SAVING CODING IN INTEGER CYCLE OR IMPULSE TYPE MODULATION TRANSMISSIONS

CROSS-REFERENCE TO RELATED APPLICATION

The present application claims the benefit of previously filed Provisional Patent Application Ser. No. 61/137,737.

FIELD OF THE INVENTION

This invention addresses the need to transport high bit-rate data over wired or wireless means using specially modulated radio frequency carrier waves. Specifically, this disclosure describes a new method of substantially reducing average transmit power by omitting transmission of a majority of pulses.

BACKGROUND OF THE INVENTION

Modulation is the fundamental process in any communication system. It is a process to impress a message (voice, image, data, etc.) on to a carrier wave for transmission. A band-limited range of frequencies that comprise the message (baseband) is translated to a higher range of frequencies. The band-limited message is preserved, i.e., every frequency in that message is scaled by a constant value. The three key parameters of a carrier wave are its amplitude, its phase and its frequency, all of which can be modified in accordance with an information signal to obtain the modulated signal.

There are various shapes and forms of modulators. For example conventional Amplitude Modulation uses a number of different techniques for modulating the amplitude of the carrier in accordance with the information signal. These techniques have been described in detail in "Modem Analog and Digital Communication Systems" by B. P. Lathi. Similarly conventional Frequency/Phase Modulation uses a number of different methods described in a number of textbooks. In all these techniques, carrier (which is a high frequency sinusoidal signal) characteristics (either amplitude, frequency, phase or combination of these) are changed in accordance with the data (or information signal). Thus there have been two major components of a modulated signal used in communication systems. One is the information-carrying signal and the other is the high frequency carrier.

Communication systems that have emerged in recent years include mono-pulse and Ultra-Wide Band communication systems. The problem with these systems is that all mono-pulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques, which have now become known by its commercial designation, xMax, were designed by the inventor of this application to help alleviate this massive and growing problem. Its signal characteristics are such that absolute minimal sideband energy is generated during modulation but that its power spectrum density is quite wide relative to the information rate applied. Also, a narrower section of the power spectrum output can be used to represent the same information. The technique of power saving coding disclosed herein is primarily applicable to these types of integer cycle and pulse modulation systems.

BRIEF SUMMARY OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006, filed by the inventor of this disclosure and is now know by its commercial designation, xMax. Pulse modulation is used in many forms and generally consists of a pulse of radio energy that can be as simple as On-Off Keying (OOK) to more complex systems like Pulse Position Modulation (PPM) and even more advanced systems such as xMax. The present invention outlines an improved method of substantially reducing average transmit power by omitting transmission of a majority of pulses.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

The invention disclosed in this application is a modified form of run length coding, which is normally used to compress data as is well known by those skilled in the art. The invention of this disclosure is to use this modified run length coding to reduce signal power in RF transmission systems. By lowering the average power, an opportunity is presented to either:

1. Decrease the total power drawn by the transmitter (battery life).
2. Raise the peak power of all symbols (Eb/No), thereby increasing range.

The amount of average transmitted power reduction will depend entirely upon the bit pattern to be transmitted. Coding systems can also be employed that actually encourage the formation of long strings of repeating data. This would further reduce the average power because more symbols are suppressed.

In the preferred embodiment of the invention the design rules are as follows:
1. Modulation is bi-phase, the same as used in Binary Phase Shift Keying (BPSK), except as noted.
2. Non-repeating binary patterns use normal BPSK parameters, with standard phase thresholds of "0" degrees.

3. Repeating binary patterns are specially coded for power saving.
   a. Power saving coding is defined as:
      i. When a repeating binary pattern is anticipated, a 4-QAM (Quadrature Amplitude Modulation) based coding system will indicate starting and ending suppressed symbols.
      ii. Subsequent repeating symbols are not transmitted at all.
      iii. Bits between the suppressed string starting symbol and the ending symbol are not detected. They are assumed.
      iv. There are four repeating binary patterns that are candidates for special coding. These are:
         1. Repeating 1's
         2. Repeating 0's
         3. Repeating alternating 1's and 0's
         4. Repeating alternating 0's and 1's
      v. Upon detection of the suppressed string ending symbol, the system returns to normal BPSK.

Thus the system of the preferred embodiment uses a hybrid BPSK/4-QAM modulation method. It is well known that 4-PSK and 4-QAM both require 3 db more power to deliver the same (Bit Error Rate) BER as BPSK (2PSK). Increasing the power by 3 db or more when the system enters the special coding mode (4PSK) will ensure a BER consistent with BPSK.

When transmitting in the normal mode, BPSK is used. BPSK is well understood and no discussion of that mode is warranted here as it is well known to those skilled in the art.

Figure 1:
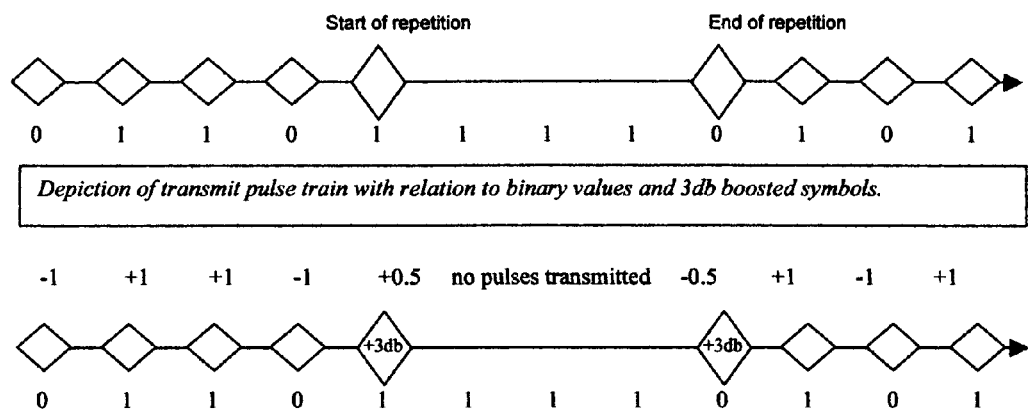
FIG. 1 is a representation of a transmit pulse train.

Transmission of a repeating binary pattern as shown in FIG. 1 provides an opportunity to signal such impending pattern to the receiving end and to cease transmission altogether until the pattern is ended. At the receiving end, the reception of the repeating pattern is simply assumed until a specially coded symbol is received to signify the end of the pattern. One binary value is assigned to each symbol clock period, according to the repeating pattern that has been signaled.

Figure 2:
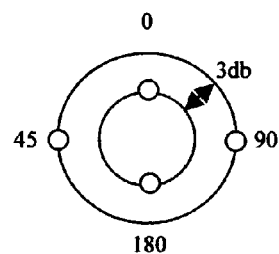
FIG. 2 is a representation of the coding constellation; and,
FIG. 3 is a table showing the special coding.

The receiver will know to switch from BPSK mode to power saving coding when the symbol received contains a phase shift of 90 degrees PLUS an amplitude shift as shown in FIG. 2. It is the combination of both the phase shift AND the amplitude shift (QAM) that will indicate a special coding (suppressed bits) string has begun or ended.

When the correct QAM code arrives, the receiver will end the power saving coding mode and return to BPSK.

Four possible repeating patterns could be signaled to the receiver. They are:
   a. Repeating 1's
   b. Repeating 0's
   c. Repeating 1's and 0's
   d. Repeating 0's and 1's Only reception of the correct ending signal will conclude the special coding. A table showing these coding patterns is shown in FIG. 3.

The opportunity then is available to raise the peak power of all bits in a ratio of the number of bits suppressed to the number of bits not suppressed. The peak power output can be controlled in response to the ratios presented to the coding system to maintain average power below the maximum dictated by law. Raising the Peak-to Average Power Ratio (PAPR) increases the Eb/No of each bit. This in turn improves the BER and increases the range of the system.

The objective of this invention is to create a coding system as good or better than BPSK. The un-coded symbols are BPSK, so they will have BPSK properties. The coded symbols are 4-QAM. It is well known that 4-QAM has the same BER performance as BPSK when the symbol power is 3 db higher, albeit at a higher power level. Therefore assuming that the BPSK coded symbols are as detectable as the coded symbols, which are transmitted at 3 db more power level than the BPSK symbols, all symbols are equally detectable and no change in the overall BER is expected.

Given that the BER curve is plotted with reference to Eb/No, and that this system uses symbols that are of two different modulation methods, the overall Eb/No value on the plot must take into account the average Eb/No of all symbols. Some of the symbols are not transmitted at all. Therefore, they have no bit energy at all. In reality, one must take the Eb/No of the specially coded symbols and divide that power amongst the symbols that have no power at all. This causes the total power of the starting and ending specially coded (4-QAM) symbols to be divided equally amongst themselves and all suppressed symbols. If there are two suppressed bits, then dividing the power of two bits with double power into two bits of no power will result in an Eb/No exactly equal to BPSK.

If there are more than two suppressed symbols, the power of the QAM coded symbols will be divided by more than two suppressed symbols. This results in an energy per bit that is actually less than the Eb/No of the BPSK coded symbols. When some of the symbols are actual BPSK and some of the symbols, which are as equally detectable as BPSK, contain less energy than the BPSK symbols, the overall performance exceeds BPSK. The amount by which BPSK performance is exceeded is entirely dependent upon the binary pattern of the data stream.

Since certain changes may be made in the power saving coding disclosed herein without departing from the scope of the invention herein involved, it is intended that all matter contained in the description thereof or shown in the accompanying figures shall be interpreted as illustrative and not in a limiting sense.

What is claimed is:

1. A method to reduce the transmit power of an integer cycle or impulse type modulated signal comprised of a coded binary data string sent between a transmitter and a receiver comprising;

said transmitter transmitting a coded binary data string using a first modulation system;

said transmitter analyzing said coded binary data string then locating and identifying in said coded binary data string one of two or more repeating binary patterns comprised of a repeating pattern of symbols starting with a first symbol and ending with a last symbol;

said transmitter at the start of said located and identified repeating binary pattern transmitting said first symbol of said repeating binary pattern using a second modulation system wherein the type of second modulation system used modulates using a different method of modulation from said first modulation system and indicates said located and identified repeating binary pattern;

said transmitter at the end of said located and identified repeating binary pattern transmitting said last symbol of said repeating binary pattern using said second modulation system;

said transmitter not transmitting any of said repeating pattern of symbols between said first and last symbols of said located and identified repeating binary pattern; and, said receiver receiving said transmitted coded binary data string including said first and last symbols and determining from the type of said second modulation system used for transmission of said first and last symbols said located and identified repeating binary pattern and inserting back into said coded binary data string said repeating pattern of symbols that were not transmitted using a synchronized clock indicating a symbol for each clock period.

2. The method of claim 1 wherein said first modulation system is a Binary Phase Shift Keying signal with standard phase thresholds of zero degrees and said second modulation system is 4-Quadrature Amplitude Modulated signals with a phase shift of ninety degrees and an amplitude shift.

3. The method of claim 2 wherein said repeating pattern of symbols comprises repeating ones, repeating zeros, repeating ones and zeros, or repeating zeros and ones.

4. The method of claim 3 wherein a coding method that maximizes the length of said repeating binary patterns is used to generate said coded binary data string.

\* \* \* \* \*